(12) United States Patent
Gu

(10) Patent No.: US 7,626,302 B2
(45) Date of Patent: Dec. 1, 2009

(54) STATOR COMPONENT FOR AN ELECTRIC MOTOR

(75) Inventor: Chunhui Gu, Villingen-Schwenningen (DE)

(73) Assignee: Minebea Co., Ltd., Nagano-Ken (JP)

( * ) Notice: Subject to any disclaimer, the term of this patent is extended or adjusted under 35 U.S.C. 154(b) by 270 days.

(21) Appl. No.: 11/647,741

(22) Filed: Dec. 29, 2006

(65) Prior Publication Data
US 2008/0157623 A1 Jul. 3, 2008

(51) Int. Cl.
*H02K 1/00* (2006.01)

(52) U.S. Cl. .................. 310/216; 310/258; 310/44

(58) Field of Classification Search ......... 310/216–218, 310/258–259, 71, 44
See application file for complete search history.

(56) References Cited

U.S. PATENT DOCUMENTS

| | | | | |
|---|---|---|---|---|
| 5,331,237 A | * | 7/1994 | Ichimura | 310/44 |
| 5,798,583 A | * | 8/1998 | Morita | 310/42 |
| 5,986,379 A | * | 11/1999 | Hollenbeck et al. | 310/257 |
| 6,127,760 A | * | 10/2000 | Nagasaki et al. | 310/254 |
| 6,166,474 A | * | 12/2000 | Kohara et al. | 310/258 |
| 6,492,749 B1 | * | 12/2002 | Shiga et al. | 310/43 |
| 2005/0206264 A1 | * | 9/2005 | Yamamoto et al. | 310/216 |

* cited by examiner

*Primary Examiner*—Thanh Lam
(74) *Attorney, Agent, or Firm*—Cooper & Dunham LLP

(57) ABSTRACT

The present invention relates to a stator component for an electric motor. The stator component for an internal rotor motor comprises a circular stator yoke having an inner periphery, a number of poles, the poles spaced apart from each other along the inner periphery of the stator yoke and extending radially inward from the inner periphery of the stator yoke, wherein each pole consists of an enlarged pole shoe and a neck connecting the pole shoe to the stator yoke, wherein the axial height of the stator yoke is higher than the axial height of the neck of each pole, and a coil wound around the neck of each pole.

The invention also relates to a stator component for an external rotor motor, wherein the stator poles are arranged along an outer periphery of the stator yoke and extending radially outward from the outer periphery of the yoke.

15 Claims, 5 Drawing Sheets

Y

STATOR COMPONENT FOR AN ELECTRIC MOTOR

FIELD OF THE INVENTION

It is described a stator component for an electric motor, the stator component comprising of a ring-shaped stator yoke with enlarged pole shoes and a routing wire channel.

BACKGROUND OF THE INVENTION

The invention is generally related to electric motors, particularly electronically-commutated, brushless direct current (BLDC) motors. Motors of this kind can be used in a variety of applications, examples being in automotive engineering for fans, cooling pumps or steering system support. Other application areas include ventilator fans in power supply units, or spindle motors in disk drives for data processing systems, just to mention a few.

A brushless DC motor basically consists of a shaft, a rotor assembly equipped with one or more permanent magnets arranged on the shaft, and a stator assembly which incorporates a stator component and phase windings. Bearings are mounted at an axial distance to each other on the shaft to support the rotor assembly and stator assembly relative to each other.

One kind of a stator component for electric motors known in the art consists of sheet metal comprising a plurality of steel plates which are laminated together. Although a sheet metal stator core has advantages of high saturation magnetic flux density and relative inexpensiveness, there has been a problem in that eddy current in the metal plates increases rapidly with increase in operating frequency of the motor. As a result of this, heat generation in the sheet metal core and magnetic core loss increase rapidly.

It is a further drawback that variations to the design of the sheet metal cores are limited by the manufacturing process.

It is also known in the art, e.g. disclosed in EP 0 869 517 B1, to use so called powder or dust cores which consist of pressed ferromagnetic metal powder. In contrast to a steel plate core, a powder core is a core produced by pressing a metal powder mixture. In this process, a binder, for example, a resin is appropriately added to the metal powder. After pressing, hardening treatment by heating, etc., so-called curing, may be performed in order to cure the added resin and the like. Examples of metal powders to be used include ferromagnetic metal powders, for example, an iron powder, an iron-based powder, or a nickel powder. Since the powder core uses a metal powder as a raw material and a resin, having superior insulation property, as a binder, the core loss in high frequencies is lower than that of an iron core using an electrical steel plate.

SUMMARY OF THE INVENTION

It is an object of the present invention to provide a stator component of a motor. The stator component should be designed so as to reduce manufacturing costs, to optimize pole shape, to reduce yoke saturation, and to minimize core losses to improve the overall efficiency of the motor.

In a first preferred embodiment of the invention, a stator component for an internal rotor motor is provided, comprising a circular stator yoke having an inner periphery, a number of poles, the poles spaced apart from each other along the inner periphery of the stator yoke and extending radially inward from the inner periphery of the stator yoke, wherein each pole consists of a pole shoe and a neck connecting the pole shoe to the stator back yoke, wherein the axial height of the stator yoke is higher than the axial height of the neck of each pole, wherein the neck of each pole is adapted to supporting a coil wound around it.

In a second preferred embodiment of the invention, a stator component for an external rotor motor is provided, comprising a circular stator yoke having an outer periphery, a number of poles, the poles spaced apart from each other along the outer periphery of the stator yoke and extending radially outward from the outer periphery of the stator yoke, wherein each pole consists of a pole shoe and a neck connecting the pole shoe to the stator yoke, wherein the axial height of the stator yoke is higher than the axial height of the neck of each pole, wherein the neck of each pole is adapted to supporting a coil wound around it.

Preferably, the stator component is manufactured by the metal powder metallurgy method. The stator component consists of a ferromagnetic metal powder and an insulating binder added to the metal powder. The ferromagnetic metal powder preferably is a powder primarily comprising iron or nickel or a mixture thereof. Compared to a stator made of sheet metal, the metal powder stator component has less core loss in high frequencies due to high specific resistance. A major advantage of a metal powder stator component is that it can be freely designed in any desired construction shape.

The stator component is concentric with an axis of the rotor of the motor. Thus it is suitable for motors with an internal or an external rotor.

In a preferred embodiment of the invention the axial height of the stator yoke is substantially equal to the axial height of the coil wound around the neck of each pole.

In another embodiment of the invention the axial height of the stator yoke is higher than the axial height of each pole shoe.

In a further embodiment of the invention the axial height of the coil wound around the neck of each pole is lower than the axial height of the pole shoe.

In still another embodiment of the invention, the axial height of a stator shoe of each pole facing a rotor of the motor is lower than the axial height of the rotor.

In an alternative embodiment, the axial height of a stator shoe of each pole facing a rotor of the motor may be substantially equal to the axial height of the rotor.

In order to maximize the magnetic flux coverage towards the poles, each pole shoe is protruding from the neck in an axial direction substantially perpendicular to the extension of the neck. In a preferred embodiment, the pole shoe protrudes in both axial directions from the neck, so that the neck and the pole shoe together form a component having a substantially T-shaped cross section. In an alternative embodiment of the invention, the pole shoe protrudes only in one axial direction from the neck, so that the neck and the pole shoe together form a component having a substantially L-shaped cross section. In both embodiments it is possible to place the rotor outside of the axial center of the stator component in order to realize a so called magnetic offset.

In order to support and/or guide the coil wire, channels or slots are formed in the surface of the stator yoke. Each channel or slot has two openings, wherein one opening lies adjacent to the neck of one pole and the other opening lies adjacent to the neck of a neighboring pole. This facilitates the crossover of the coil wire from one pole to the other pole.

The invention also relates to a stator core made by pressing and heat treating a mixture of a ferromagnetic metal powder and an insulating binder to achieve a predetermined core shape.

The stator component according to the invention is suitable for electric motors having an internal or an external rotor.

BRIEF DESCRIPTION OF THE DRAWINGS

The invention is explained in greater detail below on the basis of preferred embodiments and with reference to the drawings.

DETAILED DESCRIPTION OF THE PREFERRED EMBODIMENTS OF INVENTION

Figure 1:
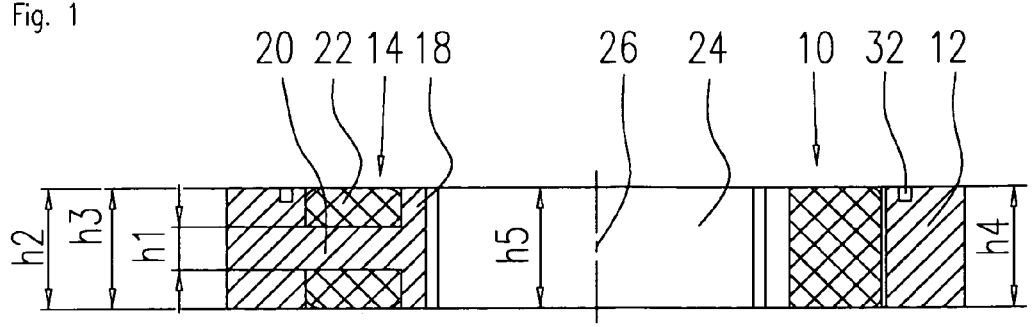
FIG. 1 shows a schematic cross section of a first embodiment of a stator component.
Figure 1A:
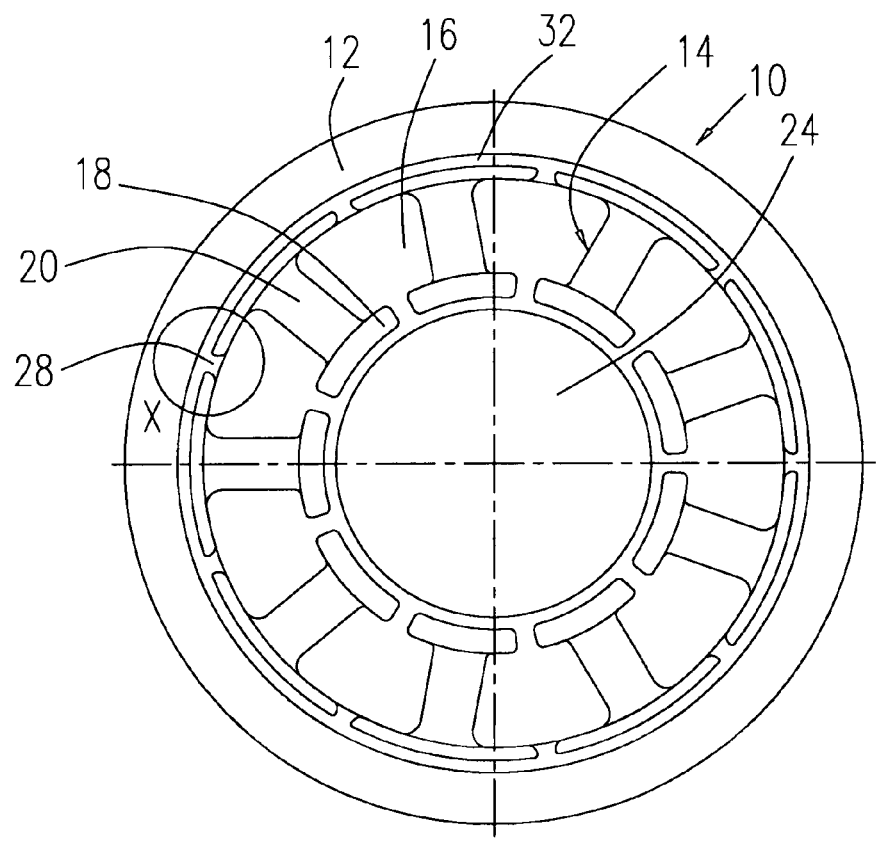
FIG. 1A shows a schematic top view of the stator component of FIG. 1 where the coils are omitted.

FIGS. 1 and 1A show a schematic cross section and a top view of a stator component 10 for use in an internal rotor electrical motor, particularly an electronically-commutated direct current motor.

The stator component 10 consists of a ring-shaped coil flux guide or yoke 12 having a height h2 and supporting several stator poles 14. In the present example nine stator poles 14 are shown. The stator poles 14 are spaced apart from each other and are regularly arranged along the inner periphery of the stator yoke 12. Each pole 14 extends radially inward from the inner periphery of the stator yoke 12. Stator slots 16 are formed between the poles 14.

Each pole 14 consists of a pole shoe 18 having a height h3 and a neck 20 having a height h1. The neck 20 connects the pole shoe 18 to the inner periphery of the stator yoke 12. A coil 22, which is part of a phase winding, is wound around each neck 20. The coil has a height h4. At a number of nine poles, three poles 18 are available for each phase winding, as it is assumed that the stator component 10 is intended for a three-phase DC motor.

Figure 1B:
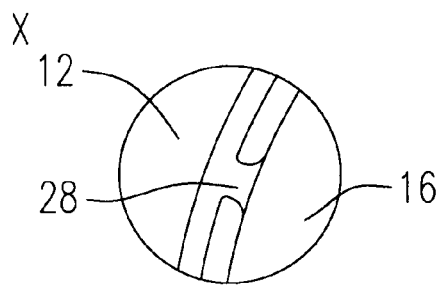
FIG. 1B shows detail X of FIG. 1A.

As shown in FIG. 1A, and in particular in the detail X of FIG. 1B, The inner periphery of the stator yoke 12 comprises a routing wire channel 32 which is used to pass a coil wire between the poles 14 and to securely guide the coil wire within the yoke 12. Between the poles 14 there are channels or slots 28 through which the wire can be passed from the routing wire channel 32 to the stator slots 16 and vice versa.

A rotor 24 having a height h5 is arranged within the stator component 10 and is rotatably supported around an axis of rotation 26. The stator component 10 is concentric with the axis 26 of the rotor 24. The axial height h5 of the rotor 24 is substantially equal to the axial height h3 of the pole shoes 18. The height h2 of the stator yoke 12 is substantially equal to the height h3 of the pole shoes 18. The height h3 of a pole shoe 18 is higher than the height h1 of the corresponding neck 20.

As shown in FIGS. 1 and 1A, each pole shoe 18 protrudes from the corresponding neck 20 in both axial directions substantially perpendicular to the extension of the neck 20, so that the neck 20 and the pole shoe 18 together form a component having a substantially T-shaped cross section. The axial height h2 of the stator yoke 12 is substantially equal to the axial height h4 of the coil 22 wound around the neck 20 of each pole.

Figure 1C:
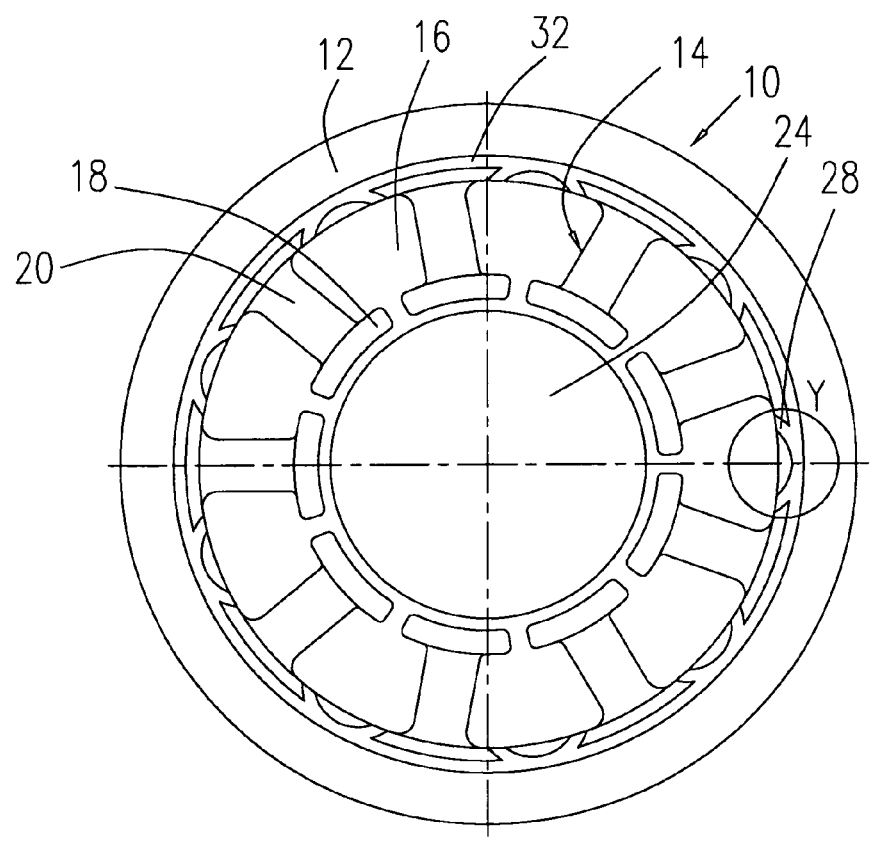
FIG. 1C shows a schematic cross section of a modified stator component similar to FIG. 1A.
Figure 1D:
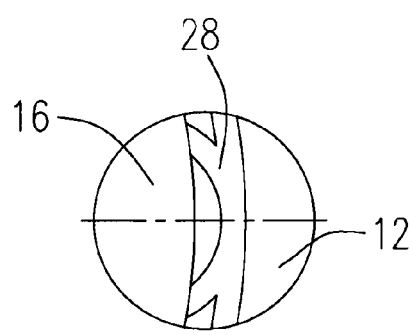
FIG. 1D shows detail Y of FIG. 1C.

FIG. 1C depicts a schematic cross section of a modified stator component similar to FIG. 1A. As shown in particular in FIG. 1D, a routing wire channel 32 is formed in the surface of the stator yoke 12 for supporting and guiding the a coil wire. Several channels 28 or slots connect the routing wire channel 32 to the stator slots 16. As shown in detail Y of FIG. 1D, to each stator slot 16 there are assigned two channels or slots 28, wherein one channel 28 lies adjacent to the neck 20 of one pole and the other channel 28 lies adjacent to the neck of a neighboring pole. This facilitates the crossover of the terminal wires between adjacent phases. This embodiment of the invention is advantageously used for stator components with a larger diameter, or, with a lager distance between the poles 14.

Figure 2:
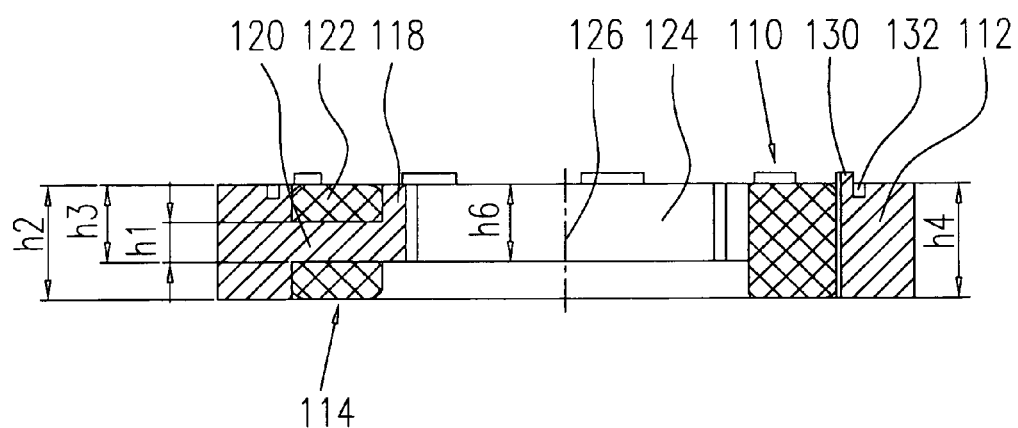
FIG. 2 shows a schematic cross section of a second embodiment of a stator component.

A further embodiment of the invention is depicted in FIG. 2. The stator component 110 consists of a ring-shaped coil flux guide or yoke 112 and a number of stator poles 114. Each pole 114 extends radially inward from an inner periphery of the stator yoke 112 and consists of a pole shoe 118 and a neck 120. The neck 120 connects the pole shoe 118 to the inner periphery of the stator yoke 112. The height h1 of the necks 120 is less than the height h3 of the pole shoes 118.

A coil 122, which is part of a phase winding, is wound around each neck 120. A rotor 124 is arranged within the stator component 110 and is rotatably supported around an axis of rotation 126. The stator component 110 is concentric with the axis 126 of the rotor 124.

Each pole shoe 118 protrudes from the corresponding neck 120 in only one axial direction substantially perpendicular to the extension of the corresponding neck 120, so that the neck and the pole shoe together form a component having a substantially L-shaped cross section. The axial height h6 of the rotor 124 is substantially equal to the axial height h3 of the pole shoes 118 but less than the axial height h2 of the stator yoke 112 and less than the height h4 of the coil 122. The rotor 124 is axially aligned with the pole shoes 118, i.e. the axial center of the rotor 124 corresponds to the axial center of the pole shoes 118.

A circular routing wire channel 132 is formed in the surface of the stator yoke 112 for supporting and guiding a coil wire.

Figure 3:
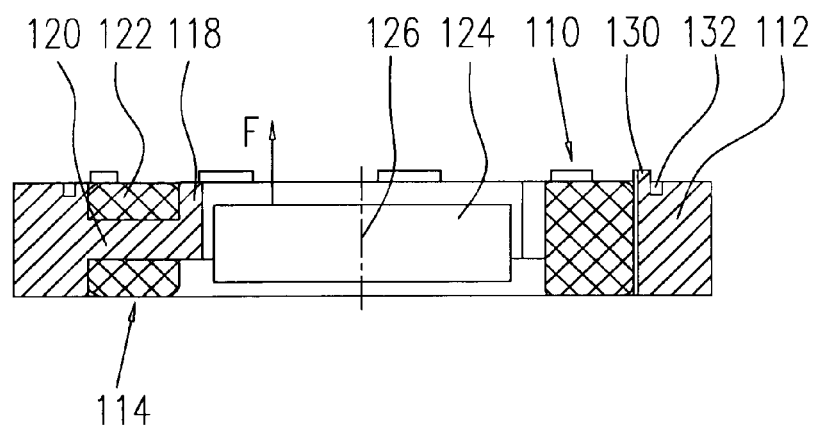
FIG. 3 shows a schematic cross section of a third embodiment of a stator component.

Another embodiment of the invention is shown in FIG. 3. This embodiment is similar to the embodiment shown in FIG. 2, wherein like elements are indicated with the same reference numerals. Reference is made to the detailed description of FIG. 2.

In contrast to the embodiment of FIG. 2, the rotor 124 of FIG. 3 is positioned with an axial offset with respect to the stator poles 118, so that the axial center of the rotor 124 lies offset to the axial center of the pole shoes 118 to generate a certain axial bias force. Alternatively, the axial bias force can be generated by an attractive plate which is located opposite the rotor in axial direction.

As shown in FIGS. 2 and 3 there can be arranged "edges" 130 adjacent to the routing wire channel 132. These edges 130 support the guiding of the wire and are used as a kind of threading aid for inserting the wire into the routing wire channel 132.

Figure 4:
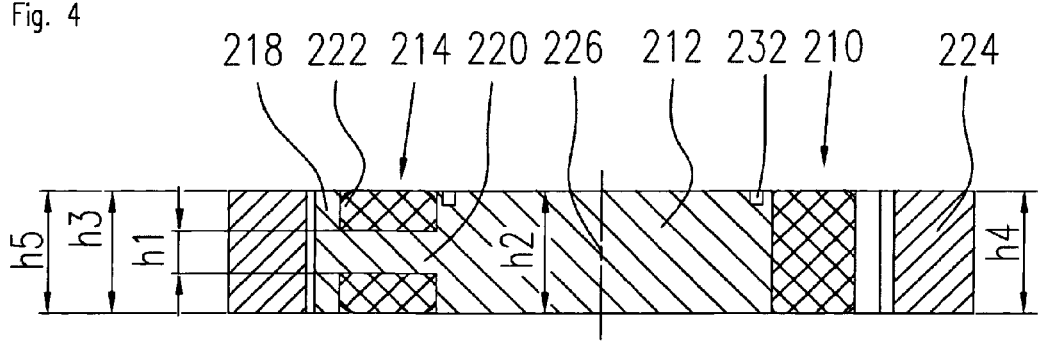
FIG. 4 shows a schematic cross section of a stator component for an external rotor.
Figure 4A:
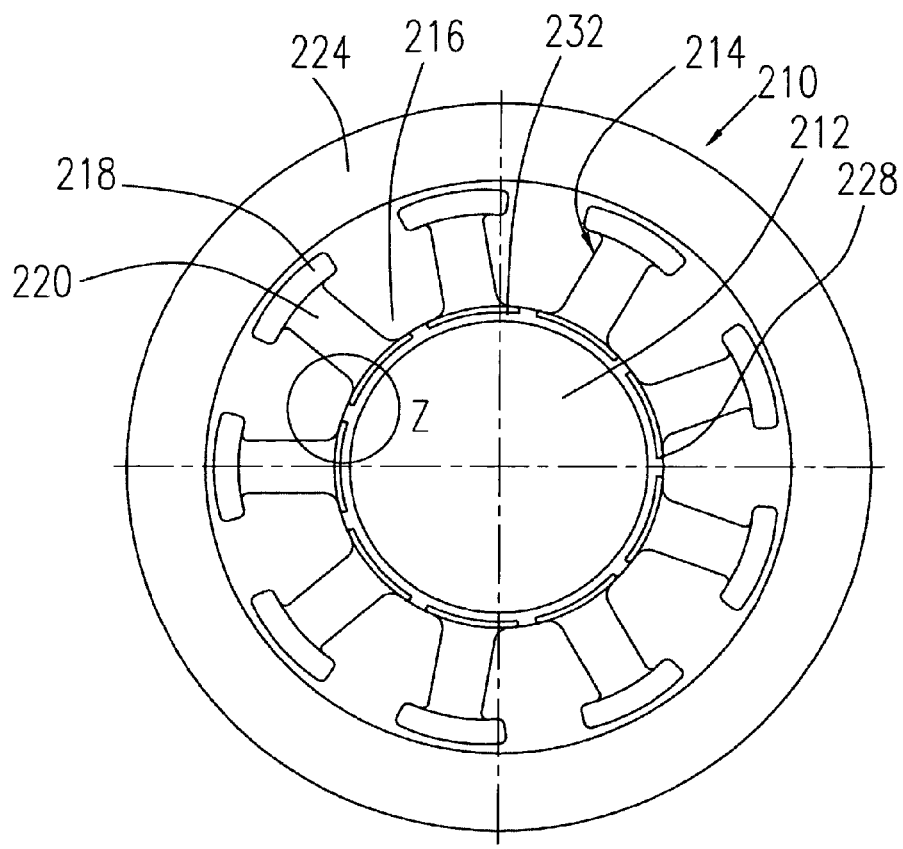
FIG. 4A shows a schematic top view of the stator component of FIG. 4 where the coils are omitted.

FIGS. 4 and 4A show a schematic cross section and a top view of a stator component 210 for use in an external rotor electrical motor, particularly an electronically-commutated direct current motor.

The stator component 210 consists of a disk-shaped coil flux guide or yoke 212 having a height h2 and supporting several stator poles 214. In the present example nine stator poles 214 are shown. The stator poles 214 are spaced apart from each other and are regularly arranged along an outer periphery of the stator yoke 212. Each pole 214 extends radially outward from the outer periphery of the stator yoke 212. Stator slots 16 are formed between the poles 214.

Each pole 214 consists of a pole shoe 218 having a height h3 and a neck 220 having a height h1. The neck 220 connects the pole shoe 218 to the outer periphery of the stator yoke 212. A coil 222, which is part of a phase winding, is wound around each neck 220. The coil has a height h4. At a number of nine poles, three poles 218 are available for each phase winding, as it is assumed that the stator component 210 is intended for a three-phase DC motor.

Figure 4B:
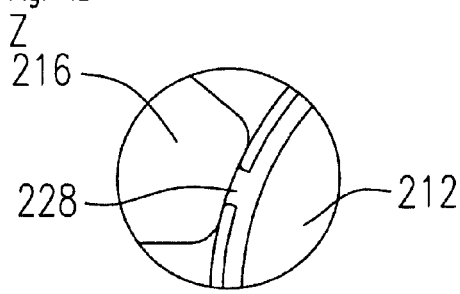
FIG. 4B shows detail Z of FIG. 4A.

As shown in FIG. 4A, and in particular in the detail Z of FIG. 4B, The outer periphery of the stator yoke 212 comprises a routing wire channel 232 which is used to pass a coil wire between the poles 214 and to securely guide the coil wire within the yoke 212. Between the poles 214 there are channels or slots 228 through which the wire can be passed from the routing wire channel 232 to the stator slots 216 and vice versa.

A ring shaped rotor 224 having a height h5 is arranged around the stator component 10 and is rotatably supported around an axis of rotation 226. The stator component 210 is concentric with the axis 226 of the rotor 224. The axial height h5 of the rotor 224 is substantially equal to the axial height h3 of the pole shoes 218. The height h2 of the stator yoke 212 is substantially equal to the height h3 of the pole shoes 218. The height h3 of a pole shoe 218 is higher than the height h1 of the corresponding neck 220.

As shown in FIGS. 4 and 4A, each pole shoe 218 protrudes from the corresponding neck 220 in both axial directions substantially perpendicular to the extension of the neck 220, so that the neck 220 and the pole shoe 218 together form a component having a substantially T-shaped cross section. The axial height h2 of the stator yoke 212 is substantially equal to the axial height h4 of the coil 222 wound around the neck 220 of each pole.

Figure 4C:
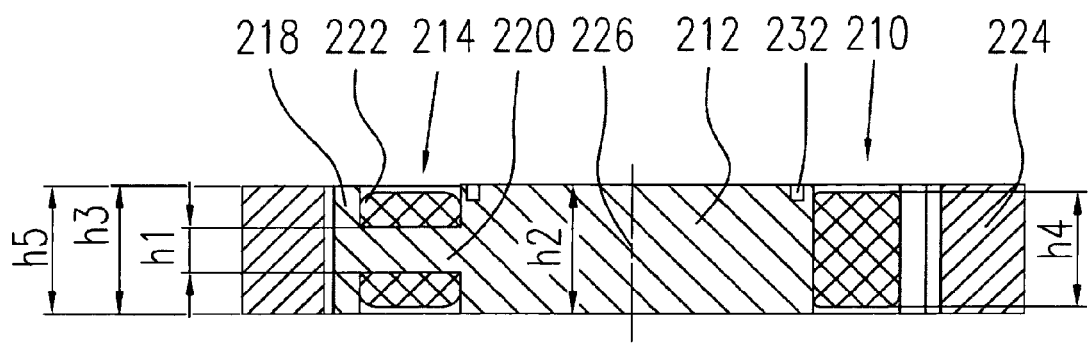
FIG. 4C shows a schematic cross section of a stator component for an external rotor where the axial height of the coil is lower than the axial height of the pole shoe.

As shown in FIG. 4C, the axial height h4 of the coil 222 wound around the neck 220 of each pole may be lower than the axial height h3 of the pole shoe 218.

LIST OF REFERENCE NUMERALS

10 Stator component
12 Stator Yoke
14 Pole
16 Stator slot
18 Pole shoe
20 Neck
22 Coil
24 Rotor
26 Axis of rotation
28 Channel or Slot
32 Routing wire channel
110 Stator component
112 Stator Yoke
114 Pole
118 Pole shoe
120 Neck
122 Coil
124 Rotor
126 Axis of rotation
130 Edge
132 Routing wire channel
210 Stator component
212 Stator Yoke
214 Pole
216 Stator slot
218 Pole shoe
220 Neck
222 Coil
224 Rotor
226 Axis of rotation
228 Channel or Slot
232 Routing wire channel
h1 Axial height of neck
h2 Axial height of yoke
h3 Axial height of pole shoe
h4 Axial height of coil
h5 Axial height of rotor 24
h6 Axial height of rotor 124

The invention claimed is:

1. A stator component made by pressing and heat treating a mixture of ferromagnetic metal powder and insulating binder to achieve a predetermined core shape, wherein the stator component has a circular stator yoke, and wherein a circumferential routing wire channel is formed in the surface of the stator yoke for supporting and guiding a coil wire.

2. An electric motor comprising a stator and an external rotor, the stator comprising:
a circular stator yoke having an outer periphery, a number of poles, the poles spaced apart from each other along the outer periphery of the stator yoke and extending radially outward from the outer periphery of the stator yoke, wherein each pole consists of a pole shoe and a neck connecting the pole shoe to the stator yoke, wherein the axial height of the stator yoke is higher than the axial height of the neck of each pole,
wherein a coil is wound around the neck of each pole, and wherein a circumferential routing wire channel is formed in the surface of the stator yoke for supporting and guiding a coil wire.

3. A stator component for an external rotor motor comprising:
a circular stator yoke having an outer periphery,
a number of poles, the poles spaced apart from each other along the outer periphery of the stator yoke and extending radially outward from the outer periphery of the stator yoke,
wherein each pole consists of a pole shoe and a neck connecting the pole shoe to the stator yoke,
wherein the axial height of the stator yoke is higher than the axial height of the neck of each pole,
wherein the neck of each pole is adapted to supporting a coil wound around it,
and wherein a circumferential routing wire channel is formed in the surface of the stator yoke for supporting and guiding a coil wire.

4. The stator component according to claim 3, wherein the axial height of the stator yoke is higher than the axial height of each pole shoe.

5. The stator component according to claim 3, wherein the axial height of the stator shoes facing the rotor is lower than the axial height of the rotor.

6. The stator component according to claim 3, wherein each pole shoe protrudes in only one axial direction substantially perpendicular to the extension of the neck, so that the neck and the pole shoe together form a component having substantially an L-shaped cross section.

7. The stator component according to claim 3, wherein there are two channels or slots for each stator pole, a first channel is arranged adjacent to the neck of one pole and a second channel is arranged adjacent to the neck of a neighboring pole.

8. The stator component according to claim 3, consisting of a ferromagnetic metal powder and an insulation binder added to the metal powder.

9. The stator component according to claim 8, wherein the ferromagnetic metal powder is a powder primarily comprising iron and/or nickel.

10. The stator component according to claim 3, wherein the stator component is concentric with an axis of the rotor of the motor.

11. The stator component according to claim 3, wherein the axial height of the stator yoke is substantially equal to the axial height of the coil wound around the neck of each pole.

12. The stator component according to claim 3, wherein the axial height of the coil wound around the neck of each pole is lower than the axial height of the pole shoe.

13. The stator component according to claim 3, wherein the axial height of the stator shoes facing the rotor is substantially equal to the axial height of the rotor.

14. The stator component according to claim 3, wherein each pole shoe protrudes from the neck in axial directions substantially perpendicular to the extension of the neck, so that the neck and the pole shoe together form a component having substantially a T-shaped cross section.

15. The stator component according to claim 3, wherein several channels or slots are formed in the surface of the stator yoke for connecting the routing wire channel to the stator slots.

* * * * *